(12) United States Patent
Grossman

(10) Patent No.: US 7,719,418 B2
(45) Date of Patent: May 18, 2010

(54) SYSTEM AND METHOD FOR LOCATING OBJECTS

(75) Inventor: Avram Grossman, Irvine, CA (US)

(73) Assignee: E-Novative, Inc., Irvine, CA (US)

( * ) Notice: Subject to any disclaimer, the term of this patent is extended or adjusted under 35 U.S.C. 154(b) by 401 days.

(21) Appl. No.: 11/689,488

(22) Filed: Mar. 21, 2007

(65) Prior Publication Data

US 2008/0231447 A1 Sep. 25, 2008

(51) Int. Cl.
G08B 1/08 (2006.01)
G08B 13/14 (2006.01)

(52) U.S. Cl. .................... 340/539.15; 340/539.21; 340/539.23; 340/539.32; 340/573.3; 340/572.1

(58) Field of Classification Search ............ 340/539.15, 340/539.21, 539.23, 539.32
See application file for complete search history.

(56) References Cited

U.S. PATENT DOCUMENTS

| | | | |
|---|---|---|---|
| 6,304,186 B1 | 10/2001 | Rabanne et al. | |
| 6,614,349 B1 | 9/2003 | Proctor et al. | |
| 6,788,199 B2 * | 9/2004 | Crabtree et al. | 340/539.13 |
| 7,046,141 B2 * | 5/2006 | Pucci et al. | 340/539.32 |
| 7,142,120 B2 * | 11/2006 | Charych et al. | 340/572.4 |
| 7,148,801 B2 | 12/2006 | Crabtree et al. | |
| 2003/0214411 A1 | 11/2003 | Walter et al. | |

\* cited by examiner

*Primary Examiner*—Donnie L Crosland
(74) *Attorney, Agent, or Firm*—Lewis Kohn & Fitzwilliam LLP; Timothy Fitzwilliam

(57) ABSTRACT

A system and method for locating objects in an approximate immediate proximity to a user is disclosed. A two-way radio transponder system is employed with a Coordinator as a parent device and multiple Identification Tags as child devices. The system is low-cost and consumes relatively low power using advancement in microcircuit technology and additionally the system employs predetermined timing cycles to further optimize power consumption. The Coordinator has a microprocessor programmed to compare signal strength in successive communication cycles to help determine the proximity of the Coordinator to the multiple Identification Tags. Additionally, in a preferred embodiment, motion sensors are used to assist in determining relative motion between Coordinator and Identification Tags. A USB port is further included for the system to interface with a PC. A method for associating the various Identification Tags, each having a unique electronic address to all others manufactured, with the particular Coordinator is also disclosed.

18 Claims, 7 Drawing Sheets

SYSTEM AND METHOD FOR LOCATING OBJECTS

BACKGROUND OF THE INVENTION

1. Field of the Invention

The present invention pertains generally to electronic transmitting devices. More particularly, the present invention pertains to systems and method for tracking objects. The present invention, in a preferred embodiment, is particularly but not exclusively, useful as an electronic tracking system and method to indicate to a user the presence of personal objects of interest.

2. Description of the Prior Art

As people move about in their daily routine or while traveling, they take a number of items with them that could potentially become lost or misplaced. Items including mobile phone, car keys, camera, briefcase, backpack, purse, PDA, and laptop computer may potentially disappear from their owner sometimes requiring time consuming searching to recover.

Numerous systems and methods have been proposed for monitoring, tracking, and locating persons, pets or objects carrying an electronic tracking device. Some have been presented as an electronic inventory for businesses tracking items. Others have been described as an electronic leash for pets or children at a day care center, or an alert system for wandering Alzheimer's patients or autistic children. While most prior art solutions are suitable for their intended purposes, most are also overly complicated and expensive solutions for wide commercial application. A relatively recent example of one such system is disclosed in Crabtree, U.S. Pat. No. 7,148,801, Article Locator System. Crabtree is directed to a system wherein a transceiver is attached to a person, animal, or item to be tracked also with a handheld locator device to send radio signals to the various transceiver devices of the system. As signals are transmitted and received from the devices, the system employs an antenna array to sample the signal at different points in space. With various samples from the antenna array, the system can employ different methods to calculate the bearing and range of the object including processing information from phase and time delays Another example of a prior art system is disclosed in Rabanne, U.S. Pat. No. 6,304,186. Rabanne similarly employs a plurality of child units each having a transceiver and a parent unit for determining if an object is within a preselected range. Rabanne further has separate communication devices for locating and controlling the plurality of child units wherein one such separate communication device is a GPS device for determining relative distance from a child unit to a parent unit.

These and other examples are particularly complicated while employing GPS or multi signal path calculations particularly if the items to be tracked are relatively close to user. Numerous other examples exist and many are limited by battery life as well as cost to implement. As advancements in electronic technology have appeared, other wireless communication proposals have emerged. For example, Bluetooth radio standard and communication protocol has gained popularity for its range of applications as transceiver microchips can presently be designed for low-cost and low power consumption. Moreover, software advancements specifically designed for low power applications, for example Zigbee, has prompted consumer electronic solutions refocusing on cost effective wider availability.

In light of the above, it is an object of the present invention to provide a System and Method for Locating Objects that is simplified over prior art solutions. It is further an object of the present invention to provide a system and method for tracking objects that is optimized for low-power and lower cost. It is yet further an object of the present invention to provide an object tracking system that can selectively track a significant number of objects up to about 250. It is still further an object of the present invention to provide an object tracking system and method that can be programmed via a computer device. Additionally, a further object of the present invention is to provide a System and Method for Locating Objects that is easy to implement, simple to use, and comparatively

BRIEF SUMMARY OF THE INVENTION

The present invention specifically addresses and alleviates the above mentioned deficiencies associated with the prior art. More particularly, the present invention comprises a system for locating objects comprising: a Coordinator unit comprising a first antenna, a first power source, a first integrated transceiver microprocessor, the first power source electrically connected to the first integrated transceiver microprocessor, and the antenna coupled to the first integrated transceiver microprocessor; an Identification Tag comprising a second antenna, a second power source, a second integrated transceiver microprocessor, the second power source electrically connected to the second integrated transceiver microprocessor, and the antenna coupled to the second integrated transceiver microprocessor; wherein the first and second integrated transceiver microprocessors communicate with each other according to predetermined timing cycles optimized for power consumption; and wherein the Coordinator unit further comprises an LCD display conveying information to a user, the information including a signal strength corresponding to a transmitted and a received power, and wherein the signal strength is a relative measure of distance between the Coordinator and the Identification Tag.

In a preferred embodiment of the present invention, the Coordinator unit further comprises a first sound device coupled to the first processor, the sound device programmed to audibly indicate when the Coordinator unit loses (or regains) communications with the Identification Tag; and wherein the first sound device comprises a simple beep generator, able to generate a plurality of combinations of short and/or prolonged beeps, wherein each of said plurality of combinations corresponds to a condition of the Identification Tag unit; and wherein the Identification Tag unit further comprises a second sound device coupled to the second integrated transceiver microprocessor, the second sound device programmed to audibly indicate when the Identification Tag receives an appropriate polling command from the Coordinator unit; and wherein the Coordinator unit further comprises a beacon coupled to the first integrated transceiver microprocessor, the beacon programmed to visually indicate when the Coordinator unit loses (or regains) communications with the Identification Tag unit; and wherein the Identification Tag unit further comprises a second beacon device coupled to the second integrated transceiver microprocessor, the second beacon device programmed to visually indicate when the Identification Tag receives an appropriate polling command from the Coordinator unit; and wherein the Coordinator unit further comprises a first user interface wherein the user can initiate a communication between the Coordinator and the Identification Tag.

Additionally in a preferred embodiment, the LCD display information further includes a Coordinator battery voltage, an Identification Tag battery voltage, an Identification Tag common name, and an indication that the Identification Tag is not responding to a communication; and wherein the Coordinator further comprises a first motion sensor able to detect when the Coordinator is physically moving, and wherein the Identification Tag further comprises a second motion sensor able to detect when the Identification Tag is physically moving; and wherein a communication between the Coordinator and the Identification Tag comprises a plurality of bytes of information, and wherein the bytes of information comprise a transmit power of the Identification Tag, and movement of the Identification Tag based on the second motion sensor, the movement available as information on the LCD display; and wherein the transmit power of the Identification Tag in successive communication cycles is compared by the first integrated transceiver microprocessor, and wherein information from the first and second motion sensors are further compared by the first integrated transceiver microprocessor to determine if the Identification Tag is moving toward or moving away; and wherein the transmit power of the Identification Tag is compared to the signal strength and wherein the transmit power of a subsequent communication cycle is optimized based on the transmit power of the Identification Tag and the signal strength.

The present invention may be further characterized wherein the Identification Tag unit further comprises a pre-programmed interval corresponding to the second integrated transceiver microprocessor enabling the Identification Tag unit to wake up and listen for communication from the Coordinator unit, the preprogrammed interval optimized for power consumption.

The invention is further characterized in that the system further comprises a plurality of second and subsequent Identification Tag units each communicating with the Coordinator unit according to predetermined timing cycles optimized for power consumption; and wherein the LCD display conveying the information further includes a signal strength corresponding to a relative measure of distance between the Coordinator and each of the second and subsequent Identification Tags; and wherein the plurality of second and subsequent Identification Tags can be selectively tracked by the Coordinator or otherwise remain inactive; and wherein the Coordinator unit further comprises a toggle switch configured to selectively scroll-up or scroll-down a list of items, the toggle switch further having a push operation to select an item, the Coordinator unit further comprising a separate switch for un-selecting an item.

The invention is further characterized in that the Identification Tag further comprises: a selectively attachable clip appropriate for fastening the Identification Tag to a pocket or a belt; a key chain clip suitable for attaching the Identification Tag to a key chain; and a carrying strap suitable for wearing around a user's neck or wrist; and wherein the Identification Tag unit is manufactured with a unique electronic address different from all others manufactured.

Yet further, the LCD display conveying information further includes a motion indicator, the motion indicator comprising symbols to indicate relative movement between the Coordinator and the Identification Tag. Additionally, a second Coordinator may be added to the invention wherein the first and second Coordinators communicate with each other having a signal strength associated therewith, the signal strength a measure of the relative distance between the first and second Coordinators; and wherein the Coordinator and the Identification Tag are comprised of durable shock resistant material; and wherein the Coordinator and the Identification Tag each comprise a battery compartment cover; and wherein the Coordinator comprises a battery voltage, the battery voltage continually monitored and wherein an indication is provided when the battery voltage drops below a minimum operating value; and wherein the Identification Tag is integrated directly into an object to be tracked, wherein the object has material suitable for Identification Tag integration; and wherein the Coordinator further comprising a USB port and wherein the first power source can be recharged via the USB port; and wherein the Coordinator is a cellular device.

In another aspect the invention is a method for tracking an object comprising: providing a Coordinator unit having a first transceiver chip and an LCD display attaching an Identification Tag unit to the object to be tracked, the Identification Tag having a second transceiver chip; communicating wirelessly between the Coordinator and the Identification Tag; optimizing power consumption for communication according to predetermined timing cycles; and conveying information to a user, the information including a signal strength corresponding to a transmitted and a received power, and wherein the signal strength is a relative measure of distance between the Coordinator and the Identification Tag.

In a preferred embodiment, the method of the invention further comprises programming the Coordinator to audibly indicate when the Coordinator unit loses (or regains) communications with the Identification Tag, wherein the programming the Coordinator to audibly to indicate when the Coordinator unit loses (or regains) communications with the Identification Tag comprises a simple beep generator, able to generate a plurality of combinations of short and/or prolonged beeps, wherein each of said plurality of combinations corresponds to a condition of the Identification Tag unit.

The method of the invention may also include: polling the Identification Tag to initiate a communication; programming the Identification Tag to audibly indicate when the Identification Tag receives an appropriate polling command from the Coordinator unit; programming the Coordinator to visually indicate when the Coordinator unit loses (or regains) communications with the Identification Tag unit; polling the Identification Tag to initiate a communication; and programming the Identification Tag to visually indicate when the Identification Tag receives an appropriate polling command from the Coordinator unit; displaying information on the Coordinator unit, the information including a Coordinator battery voltage, an Identification Tag battery voltage, an Identification Tag name, and an indication that the Identification Tag is not responding to a communication; detecting when the Coordinator is physically moving; detecting when the Identification Tag is physically moving; processing the detection of the moving of the Coordinator and the Identification Tag along with a transmit power and a received power of successive communication cycles to determine if the Identification Tag is moving toward or moving away; comparing a transmit power of the Identification Tag to the signal strength and wherein the transmit power of the subsequent communication cycle is optimized based on said transmit power of the Identification Tag and said signal strength; and manufacturing the Identification Tag unit with a unique electronic address different from all others manufactured.

Additionally, the method comprises providing a plurality of second and subsequent Identification Tag units each communicating with the Coordinator unit according to predetermined timing cycles optimized for power consumption; and wherein the conveying the information further includes a signal strength corresponding to a relative measure of distance between the Coordinator and each of the second and subsequent Identification Tags; and wherein the method further comprises selectively tracking the plurality of second and subsequent Identification Tags using the Coordinator.

Still further, the method comprises: providing for the Coordinator a toggle switch configured to selectively scroll-up or scroll-down a list of items, the toggle switch further having a push operation to select an item; providing the Coordinator a separate switch for un-selecting an item. Furthermore, the method includes providing a cellular device configured for use as a coordinator. The method also includes preprogramming an interval for the Identification Tag unit to wake up and listen for communication from the Coordinator unit, the interval optimized for power consumption.

Yet still, method comprises: providing a USB port to the Coordinator; uploading selectable features to the Coordinator from a computer device via a USB cable; providing a clip for the Identification Tag appropriate for fastening the Identification Tag to a pocket or a belt; providing a second Coordinator; communicating between the first and second Coordinator having a signal strength associated therewith, the signal strength a measure of the relative distance between the first and second Coordinators; manufacturing the Coordinator and the Identification Tag of durable shock resistant material; and providing a battery compartment cover for each of the Coordinator and the Identification Tag.

Yet still further, the method is characterized wherein the Coordinator comprises a battery voltage, and the method further comprises continuously monitoring the battery voltage and providing an indication when the battery voltage drops below a minimum operating value; and wherein the method further comprises integrating the Identification Tag directly into an object to be tracked, wherein the object has material suitable for Identification Tag integration; and wherein the Coordinator further comprises a power supply and a USB port, the method further comprising recharging the power supply via the USB port.

Additionally, the method is characterized wherein the conveying information further includes a motion indicator, the motion indicator indicating relative movement between the Coordinator and the Identification Tag using symbols.

In another aspect the invention is a method of associating a plurality of Identification Tags to a Coordinator, the method comprising: providing each Identification Tag with a unique MAC address; transmitting from a first Identification Tag to the Coordinator to start the associating along with a first unique MAC address for the first Identification Tag; receiving the first unique MAC address to the Coordinator; comparing the first unique MAC address to a list of previously associated MAC addresses; adding the first unique MAC address to the list of previously associated MAC addresses, in the event that the first unique MAC address is not currently on the list; entering a common name of an object associated with the first Identification Tag; and repeating the method for second and subsequent Identification Tags.

Further the method of associating a plurality of Identification Tags to a Coordinator is characterized wherein subsequent to the receiving the first unique MAC address to the Coordinator, the method further comprised transmitting to the first Identification Tag that the Coordinator is "associating." Also this method can be further characterized wherein if the first unique MAC address is currently in the list of previously associated unique MAC addresses, the method further comprises transmitting to the first Identification Tag "previously associated;" and wherein the method further comprises transmitting "associated" to the first Identification Tag after the entering the common name of the object associated with the first Identification Tag.

These, as well as other advantages of the present invention, will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5 is a block diagram of an Identification Tag;

DETAILED DESCRIPTION OF THE PREFERRED EMBODIMENTS

A. Overview

Figure 1:
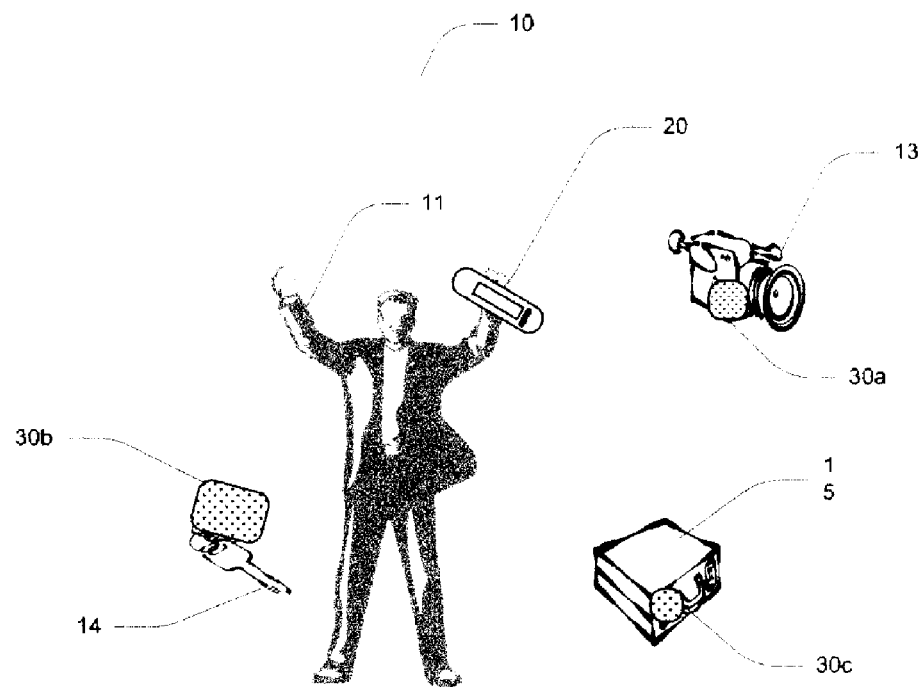
FIG. 1 is a schematical diagram depicting objects leaving or coming into a person's proximity that may be selectively tracked according to the present invention.

Referring initially to FIG. 1, an embodiment of the present invention is illustrated having a two-way radio transponder system, generally designated 10, that is used to notify user 11 when objects being tracked 13, 14, 15 come into user's 11 approximate immediate proximity or leave the immediate proximity. Coordinator 20 is a locator device and is more closely viewed in FIGS. 2A, 2B and 2C.

FIG. 1 generally depicts the present invention wherein user 11 is in possession of a Coordinator 20. Objects of interest 13 through 15 each have an Identification Tag 30*a* through 30*c* (FIGS. 3A and 3B) affixed to them. Additionally, each Identification Tag (hereinafter "ID Tag") 30*a*-30*c* has been manufactured with a unique electronic address that is then assigned a common name by the user 11 programmed into Coordinator 20. Common names may describe objects to be kept track of, such as "camera" 13, "car keys" 14, "briefcase" 15 as illustrated in this example.

Further to FIG. 1 and FIG. 2, as any of the objects 13-15 come into range of the user 11, the user 11 is alerted. User 11 may select that a particular object 13-15 be kept track of, or ignore it. As objects that are being tracked begin to move away from user 11, the user 11 is alerted either visibly or audibly. Visual indication, in various embodiments may include a light-emitting diode 17 or, a visual display 16 showing the common name 16d of the object of interest and an indication 16b of the relative motion of that object. In a particular embodiment, motion sensors 56 (FIG. 5) inside ID tags 30a-30c help to determine if user 11 is moving away from an object being tracked, or if the object is moving way from the user 11. If for example, an object 15 is being carried away by someone else, or if the object 15 is arriving on a baggage conveyor belt, motion is detected together with a change in radio signal strength received by the Coordinator 20 in successive communication cycles.

Figure 2A:
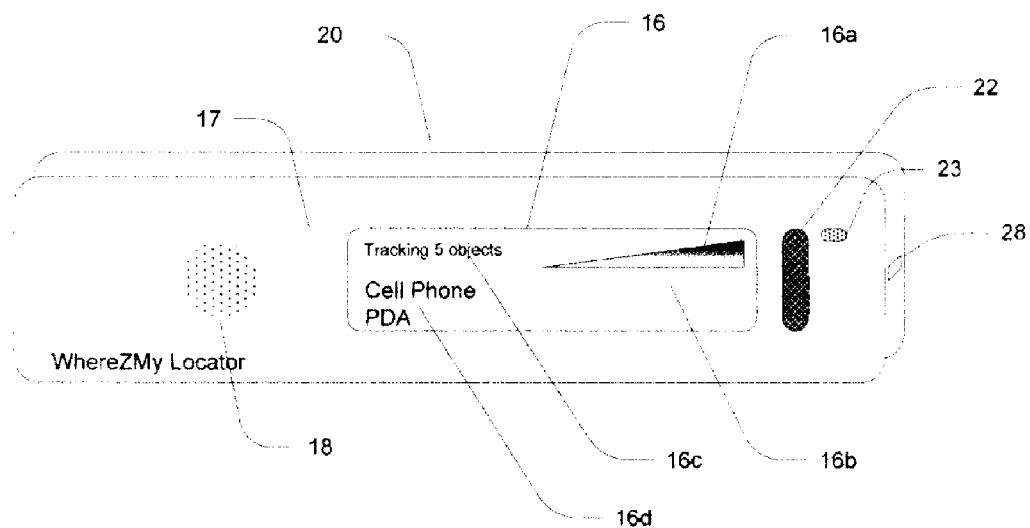
FIGS. 2A, 2B and 2C are frontal and side views illustrative of a particular embodiment of a Coordinator of the present invention.

More specifically referring to FIG. 2A, user 11 may scroll 22 through a display 16 of object common names 16d, for example, seeking the location of an object of interest. If object 14 is the object of interest, user 11 will scroll 22 to; "car keys" 14 on display 16d and press a button 22 which will send a signal to a "car keys" ID tag 30b causing that ID tag 30b to beep 33 (FIG. 3A), and flash an indicator light 32. In the specific embodiment illustrated, scroll switch 22 is also a push button 22 and essentially a 3-way switch comprising up, down and push selections.

As previously stated, when any of the objects 13-15 come into radio transmission receiving range of the Coordinator 20, the user 11 is alerted by both an audible beep sound 18, and a visual display 16 of that common name 16d along with an indication 16b of the relative motion of that object. User 11 may select 22 that object to be kept track of, or to ignore it for the time-being. As objects that are currently being tracked begin to move away from user 20, the user is alerted 16b. In a particular embodiment of the present invention, motion sensors 56 inside the ID tag 30 help to differentiate between the user 11 moving away from an object being tracked, or if the object is moving away from the user 11. Additionally, objects 13-15 may be in the proximate range of the Coordinator 20 but may not be visible to user 11. To assist in locating a particular object 13-15, the user 11 may scroll 22 thru the display 16d of object common names 16d, and, for example, select "car keys" 14 and press a "call" button 22 on Coordinator 20 which will send a signal to the ID Tag 30b causing that ID tag 30b to emit an audible beep 33 and flash a visual indicator light 32.

Figure 3A:
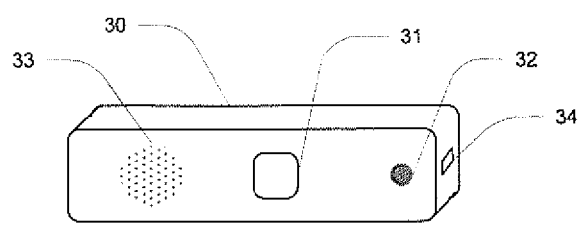
FIGS. 3A and 3B are isometric and side view illustrations of a particular embodiment of a Transponder Identification Tag of the present invention.
Figure 3B:
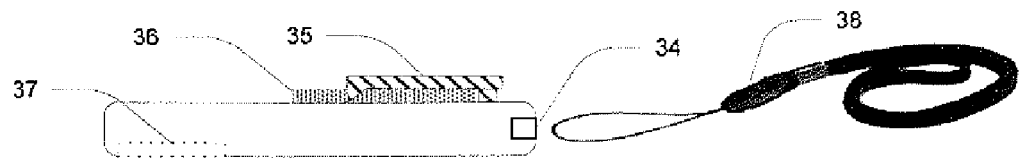
Figure 4:
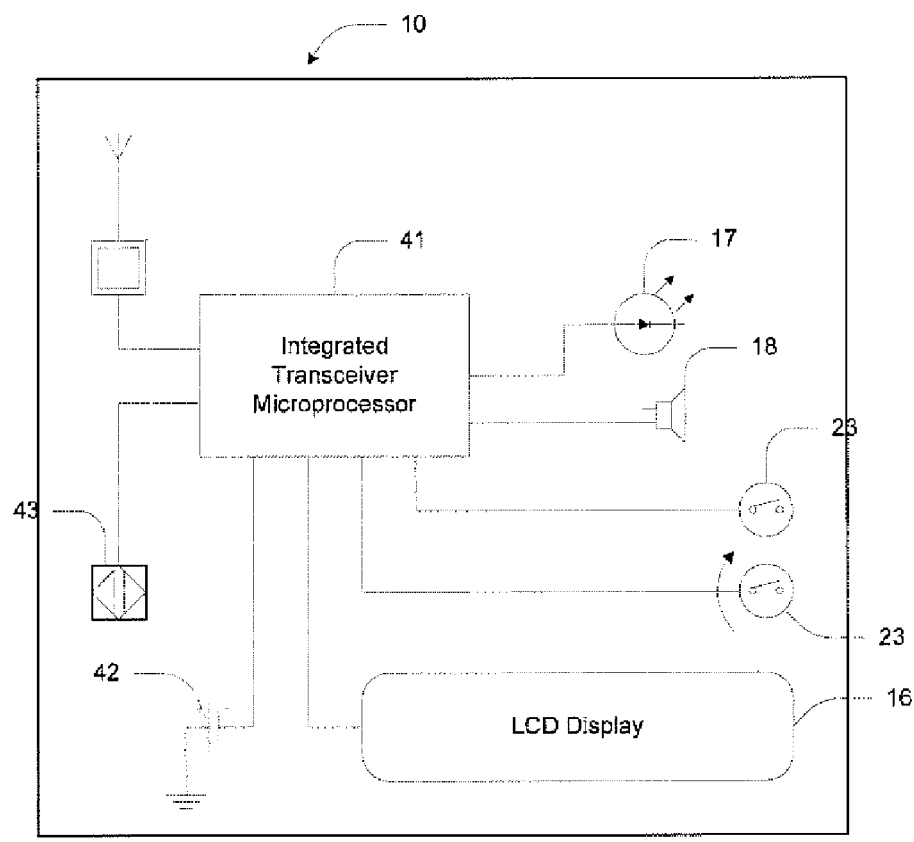
FIG. 4 is a block diagram of a Coordinator.
Figure 7:
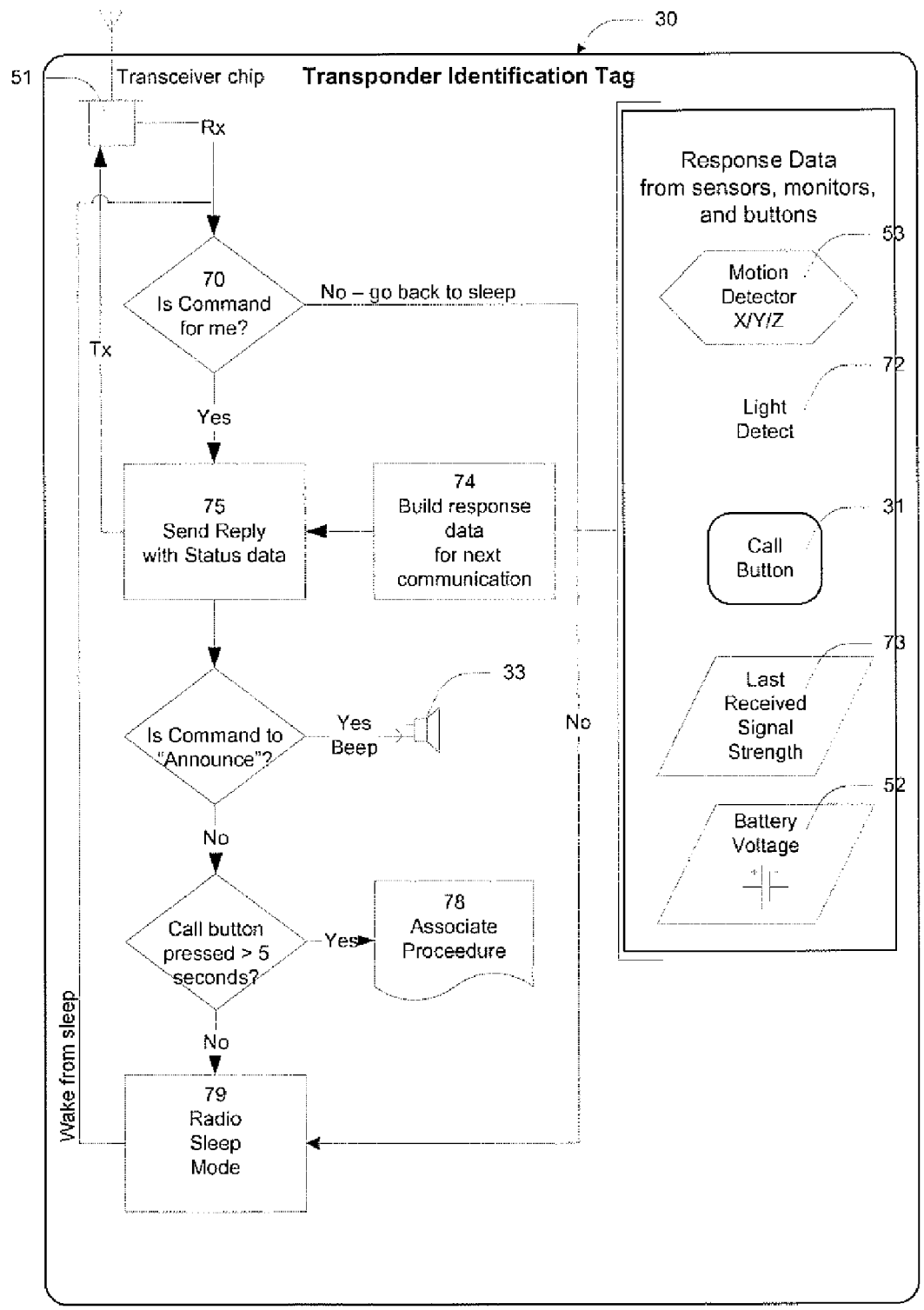
FIG. 7 is a flowchart depicting the workflow of a particular Identification Tag's main programmed processes.

Also referring to FIG. 2A, Coordinator 20 contains a list 16d of all Transponder ID Tags 30 that user 11 has programmed into Coordinator 20. FIGS. 3A and 3B illustrate isometric and side views of a Transponder ID Tag 30 that could be any one of ID Tags 30a-30c of an embodiment of the present invention. For each ID Tag 30 that is currently being tracked, the Coordinator 20 transmits a modulated radio frequency signal which includes the unique identification code of that ID Tag 30 together with a "Hello" command 70 (FIG. 7). Each ID Tag 30 periodically wakes up from power-saving sleep mode to listen for a "Hello" addressed to it. Importantly, Coordinator 20 transmits to the objects being tracked at predetermined timing intervals optimized for cost of system 10 and power consumption. Additionally, the radio circuits contained within ID Tags 30 are smaller in size and lower in cost making system 10 a viable solution to tracking objects than previously conceived. The ID Tag 30 which corresponds to the transmitted identification code then responds with a packet of information which the Coordinator 20 records in RAM memory within the microprocessor circuitry 41. This packet of information transmitted back from the ID Tag 30 to the Coordinator 20 may contain, in a particular invention embodiment, the signal strength 73 of the received transmission, the status of the motion sensor 53 and other sensors 72, and its battery level 52. As the Coordinator 20 polls each ID Tag 30, it is able to determine from changes in the previous signal strength 73 motion sensor 53 indicator, whether the object being tracked is moving away from or coming toward the user 11, with the purpose of notifying the user 11 when said object is in proximity of the user 11. In this manner, the user 11 may know if some object they have in their possession is about to leave their immediate proximity or is no longer in their immediate proximity.

B. The Transponder Identification Tag

FIG. 3A illustrates one embodiment of the Transponder ID Tag. The ID Tag 30 is very small in size and may be attached to any variety of objects that one may wish to track. A carrying strap 38 may be attached to the eyelet 34 such that the ID Tag 30 may be worn around the wrist or as a necklace. Belt-clip 35 permits the ID Tag 30 to be easily attached to objects. A double-sided tape foam pad 36 is provided as an option such that the ID Tag 30 may be adhered to a flat surface of an object to be tracked. The enclosure of the ID Tag 30 may be made of a durable and water-resistant material, for example such as plastic, and is built to withstand a reasonable amount of shock and impact.

The ID Tag 30 further may be powered by a small watch-type battery 52. Owing to the extremely low power consumption of the integrated radio transceiver and microprocessor technology 41 and 51 respectively, a battery life of several months to more than a year can be expected even under continuous use. The battery voltage 52 of the ID Tag 30 is constantly monitored by Coordinator 20, and as the ID Tag 30 battery voltage 52 drops below a minimum good operating value, the user 11 is alerted that the battery 52 should be replaced, accessible from the battery compartment cover 37.

In a particular embodiment, the ID Tag 30 electronic circuits are built into a self-contained plastic housing. In another embodiment, it may be desirable to integrate the ID Tags 30 electronic circuits directly into the device to be tracked, such as in the handle of a briefcase or suitcase, or woven into the fabric of a dog collar. Additionally, how and where the ID Tag 30 is integrated into objects to be tracked is not limited by this embodiment.

Transponder ID Tags 30 have a primary function of responding to queries from an associated Coordinator 20, and alert user 11 when an object being tracked is either leaving the immediate proximity or entering into the immediate proximity of the user 11. In a particular embodiment, the ID Tag 30 contains a pushbutton 31 that may be used either to: 1) associate itself with a particular Coordinator 20, or 2) send a "call" signal to the associated Coordinator 20.

Further in a particular embodiment ID Tag 30 contains enunciator 33, or alternatively sound generator 33, which, upon receipt of a command from the Coordinator 20 to beep, emits an audible signal tone. Several types of signal tones may be emitted by the ID Tag 30 based on the intended purpose. In a separate embodiment, ID Tag 30 may be pre-preprogrammed with specific mode of operation instructions whereby in the event that an ID Tag 30 does not receive a "Hello" signal from the Coordinator 20, it may emit a distinct alerting tone. As an example, if briefcase 15 is being carried away by someone other than its owner, the distinct alert tone might deter the person from walking away with briefcase 15. In the situation where the user 11 would like to locate an object with an ID Tag 30 that is not clearly visible, the user 11 may select the particular ID Tag 30 and send it a "beep" message. If that ID Tag 30 is within range of the radio broadcast, it will respond by beeping the enunciator 33.

Additionally in a particular embodiment, the ID Tag 30 contains a visible light emitting diode (LED) 32, or beacon 32, which may be used to illuminate the ID Tag 30, making it easier to visually locate. Functioning in much the same way as sound generator 33, LED 32 provides a silent means of visually locating an ID Tag 30 in such situations where an audible sound is not desired. Such a situation could include when the ID Tag 30 is affixed to luggage that is passing through a security checkpoint at an airport.

Referring to FIG. 5, a block diagram of main electronic components is illustrated for an embodiment of ID Tag 30. At the heart of ID Tag 30 is a single microelectronics chip 51. Chip 51 is a highly-integrated very low-power circuit that combines a low-power radio-frequency transceiver, microprocessor, Flash memory used to store the program, and RAM used to store temporary information. System 10 takes advantage of latest advancements in microcircuit technology wherein smaller, lower power, low-cost integrated circuits are known and available allowing for system 10 that is commercially viable. A radio antenna 50 connects to the integrated Transceiver chip 51. In this embodiment, an "F" type antenna is manufactured onto the printed circuit board. In another embodiment, the antenna may be a chip-type antenna. In this embodiment, a visual light-emitting diode 32, an enunciator 33 and a pushbutton switch 31 provide for user input/output. A motion detector chip 53 detects when the ID Tag 30 is moving.

C. The Coordinator

Figure 8:
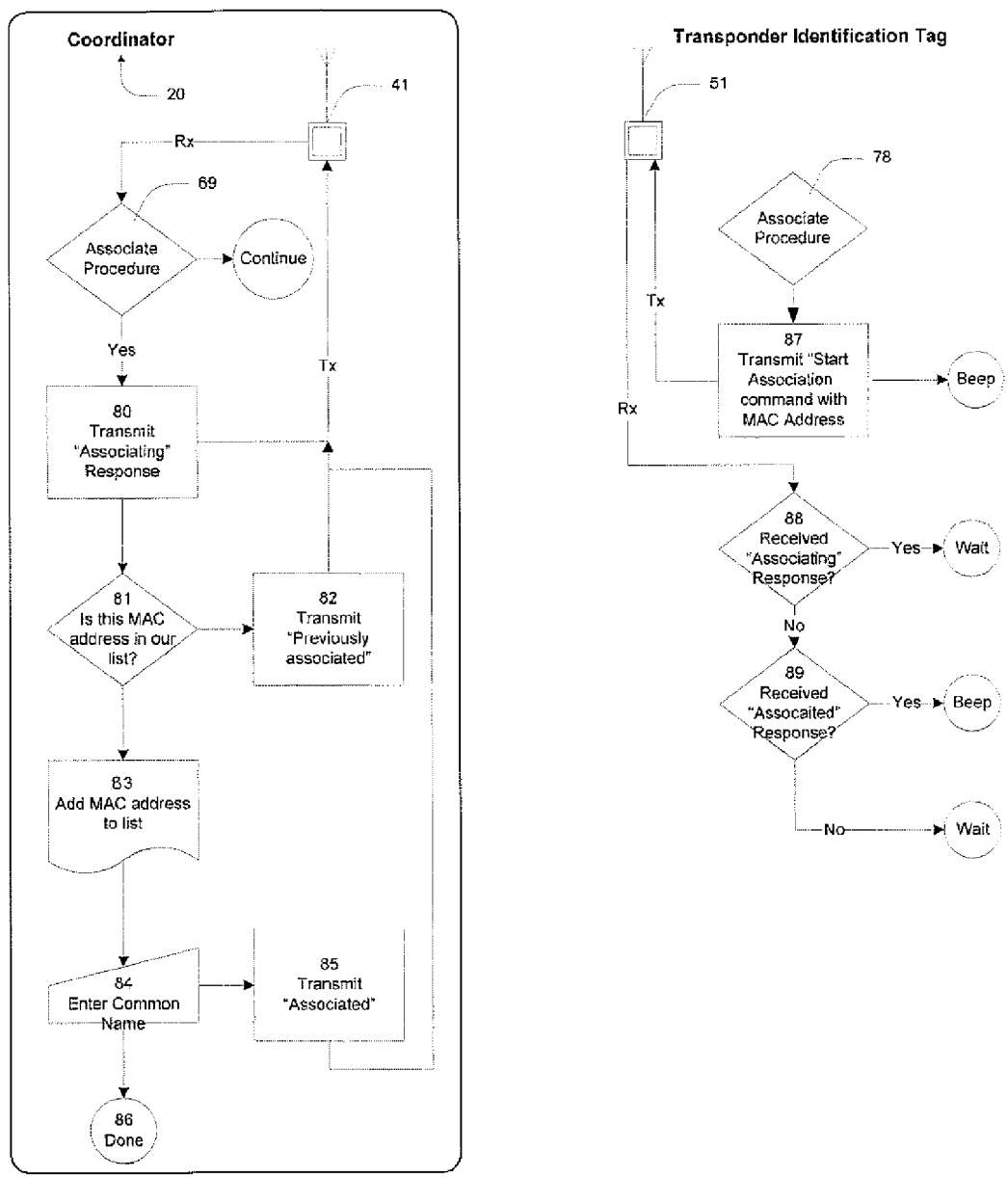
FIG. 8 is a flowchart depicting the procedure of associating an ID Tag with a Coordinator.
Figure 9:
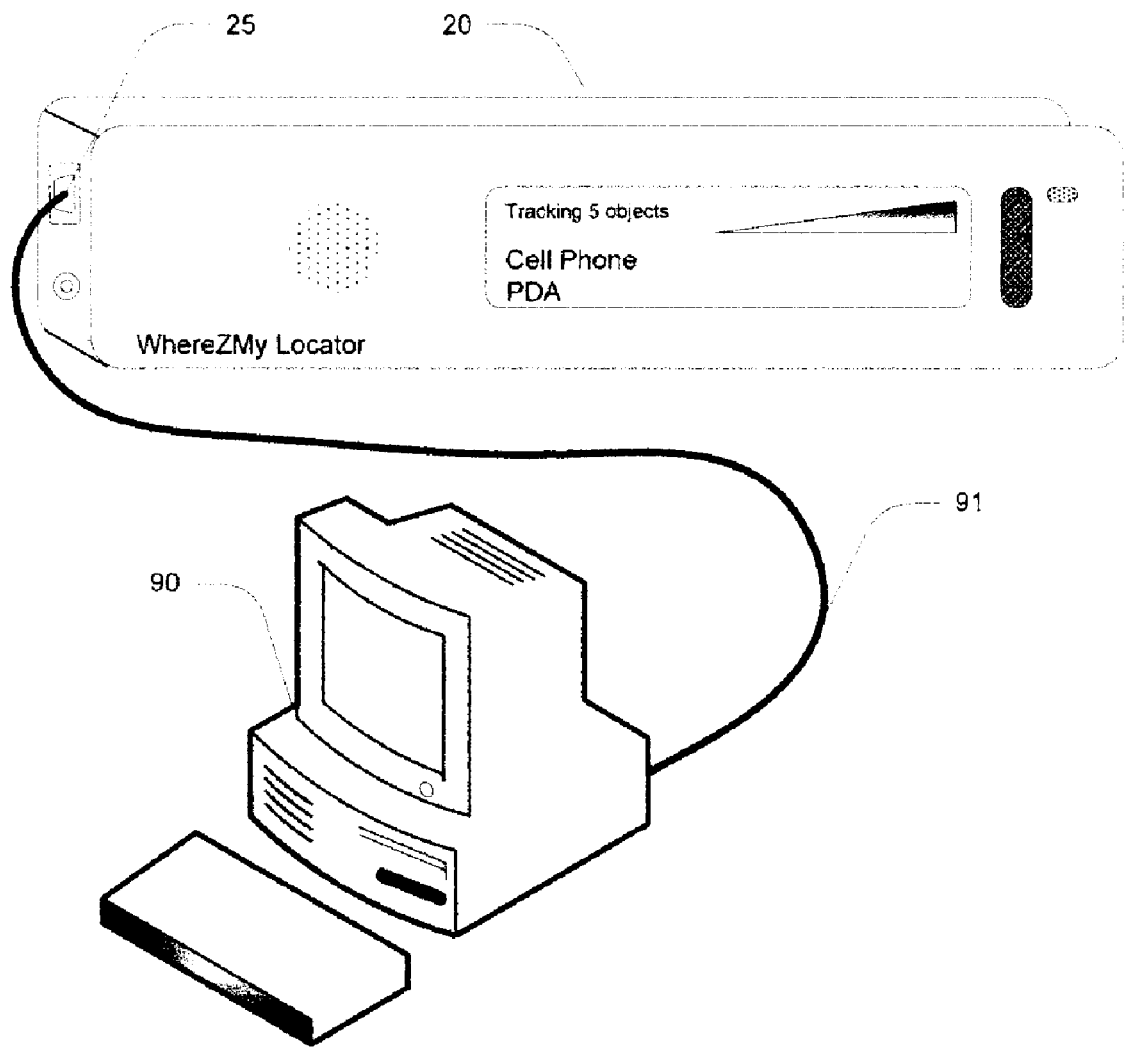
FIG. 9 is a schematical illustration depicting the connection of a Coordinator to a personal computer using a USB cable.

FIG. 2A through FIG. 20 illustrate one embodiment of the Coordinator 20, having an outer enclosure which is relatively small in size and lightweight that may be carried by the user 11 in a hand, a shirt or jacket pocket, or clipped to a purse strap or belt via a clip 27. An eye-hook 28 molded into the case permits the attachment of a strap 26 so that the Coordinator 20 may be held more securely in the hand or worn around a user's 11 neck. The housing is preferably made of a tough and durable material. In a particular embodiment material housing is made of molded plastic, and is water resistant. The device 20 is battery powered and further battery 42 may either be replaceable or rechargeable through the external power plug 24. In one embodiment, a rechargeable battery 42 may be recharged from voltage derived from the USB port 25 when said port 25 is connected to a personal computer 90 (FIG. 9).

In an embodiment of the present invention, the Coordinator 20 has user input controls 22 and 23 and a display screen 16, using either a reflective or backlight type liquid crystal display (LCD) 16, an audible sound enunciator 18 and a visible light emitting diode (LED) 25. The user 11 employs user controls 22 and 23 to navigate through the menus programmed into the Coordinator 20, and the display screen 16 is used to display the various menu options to the user 11.

User control 22, in this embodiment, is a single multifunction thumbwheel selector. This multi-function thumbwheel switch 22 makes it easy for the user 11 to operate the Coordinator 20 holding in one hand and operating the user controls 13 and 14 with a single thumb or finger. The multi-function thumbwheel switch 22 is rotated downward to advance to the next menu item 16d, rotated upwards to return to the previous menu item 16d, and pushed inwards to select the current menu item 16d. Pushbutton switch 23 is used to cancel or exit from a menu mode or function and return to the previous menu level.

Further in a particular embodiment, Coordinator 20 has an LCD display 16 which is used to display to the user 11 many kinds of information pertinent to the operation and usage of the system 10. This LCD display 16 may be custom built such that alphanumeric characters and graphic characters are presented to user 11. The current mode of operation and menu items are displayed in areas 16c and 16d using alphanumeric characters. In this embodiment, the LCD display presents Roman characters for English, Spanish, and most European languages. In another embodiment display 16 may present characters used in Asian languages such as Chinese, Japanese and Korean, or Russian (Cyrillic), Hebrew, Arabic and other languages. Components of Coordinator 20 could further be integrated into a cellular device.

Additionally, in this embodiment, Coordinator 20 conveys the distance and motion that an ID Tag 30 may have relative to the user 11 holding Coordinator 20. Many prior art devices have presented components and methods for calculating a specific position or exact distance and direction of an object relative to user 11. However, these techniques require the utilization of extra antennas, electronic circuitry, processing logic and displays, or even external systems such as GPS, which add cost and complexity to such devices. The present invention concerns itself primarily with addressing the user's question "where is my . . . ?" or, "is my . . . in my immediate proximity?" The moving average of the ID Tag 30 received signal strength is displayed in the bar indicator 16a and the relative direction of motion of the ID Tag 30 is displayed in the Motion indicator 16b.

Table 1 illustrates icons 16b represented in LCD display 16 to convey the most recent motion direction and relative distance information to user 11. In addition to the display of motion indicators 16b, Table 1 presents a legend of beep sounds that provide an audible indication as to the nature of change in relative motion of Coordinator 20 to ID Tag 30. For example, a single beep may indicate that one of the objects being tracked is moving closer (or that the user 11 is moving closer to the object). In a case where the user 11 is moving toward multiple objects being tracked 13-15, as each object 13-15 is polled, a beep sound will be generated for each object. A rapid double-beep could indicate the user 11, or objects 13-15 are moving apart. Three rapid consecutive beeps may indicate to the user 11 an object not recently in proximity that has arrived into proximity. A prolonged beep may indicate to the user 11 that an object is now longer in proximity. As each alert beep signal is generated, the common name 16d of that object creating the alert signal is displayed on the LCD display 16 in 16d together with the Motion Indicator 16b from Table 1.

TABLE 1

| Motion Indicator | Beeps | Legend |
|---|---|---|
| ◁◆▷ | * | Object Moving Closer |
| ◁◆ | ** | Object Moving Farther |
| ▷ | * | User Moving Closer |
| ◁ | ** | User Moving Farther |
| ◁ ▷ |  | No Change |
| ◆ ▷ | *** | Object Returning |
| ◁ ◆ | — | Object Gone |
| ◆ | **** | Object Moved |
| ◁ |  | User Gone |
| ▷ | *** | User Returning |

Beep Legend
\* short beep
- long beep

The Coordinator 20 can be powered by a small watch-type battery 42, for example. Owing to the extremely low power consumption of the integrated radio transceiver and microprocessor technology 41, battery life of several months to more than a year can be expected even under continuous use. The battery voltage of the Coordinator 20 is constantly monitored by circuitry built into the electronic chip 41. As the Coordinator 20 battery voltage drops below a proper operating value, user 11 is alerted that the battery 42 should be replaced or recharged. The battery 42 is accessible from the battery compartment cover 29. In one embodiment, a rechargeable watch-type battery may be installed and recharged by plugging in a battery-charger into DC input 24.

Figure 2B:
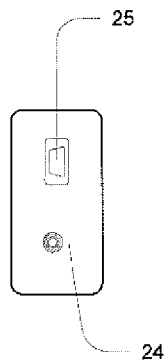
Figure 2C:
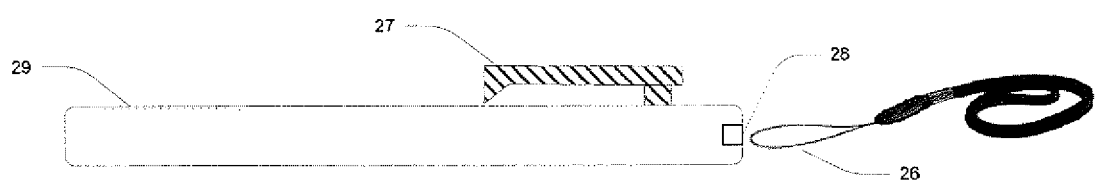

The Coordinator 20 may be connected to a personal computer through a small USB connector 25 located on the side of the Coordinator 20 (FIG. 2B). An application program written specifically for programming the Coordinator 20 using a Personal Computer 90 connected through the USB port 25 on Coordinator 20 permits the user 11 to enter common names 16d for each Transponder ID Tag 30a-30c.

D. Communication Between Coordinator and Transponder ID Tags

Each ID Tag 30 is manufactured with a unique digital address or Media Access Control (MAC) address embedded into the electronic circuit or chip 41 and 51. The MAC address consists of 6 sets of 2-digit hexadecimal numbers, as defined by the IEEE MAC-48 standard. Each hexadecimal number may range in value from 00 to FF (hexadecimal numbers are 0 thru 9, A, B, C, D, E, and F allowing for 16 decimal equivalent values per digit). The total possible unique MAC addresses thus is $2^{48}$ or 281,474,976,710,656 possible MAC addresses.

Figure 6:
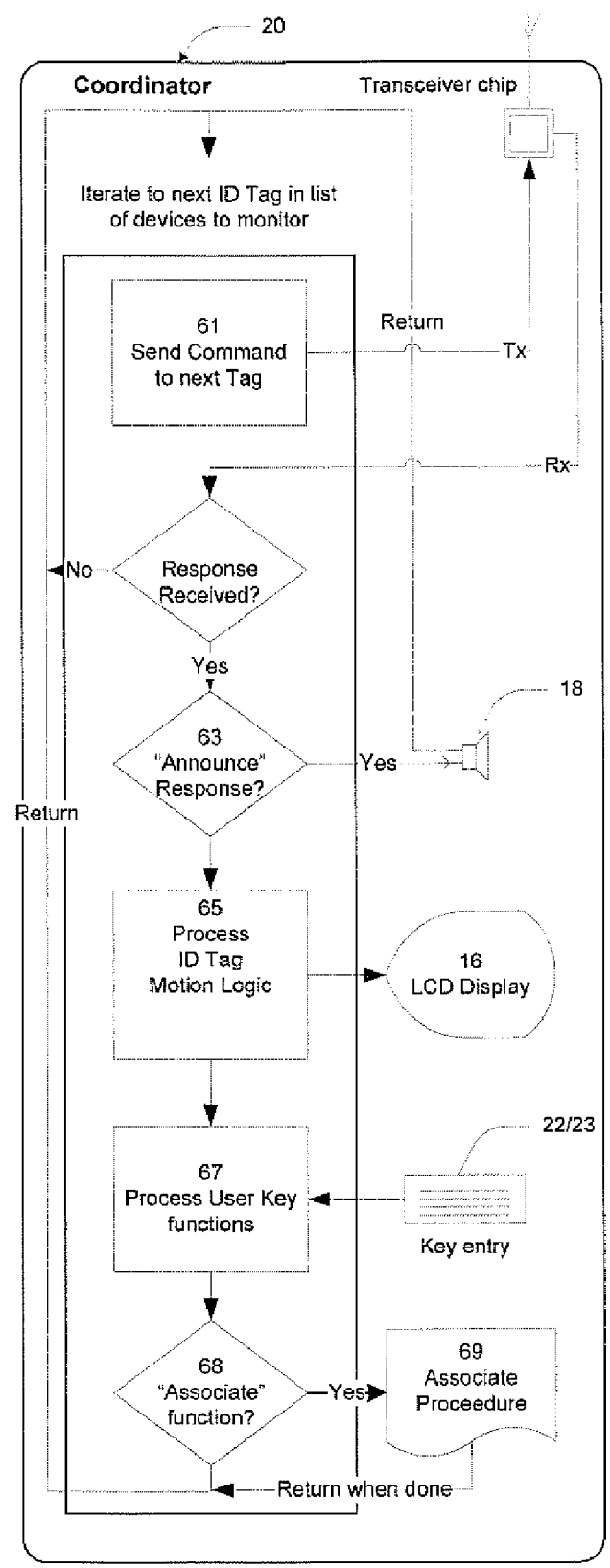
FIG. 6 is a flowchart depicting the workflow of a particular Coordinator's main programmed processes.

FIG. 6 and FIG. 7 are flowchart diagrams depicting the overall program logic for the Coordinator 20 and ID Tag 30 respectively. FIG. 8 is a flowchart depicting the process of how an ID Tag 30 becomes associated with a particular Coordinator 20.

E. Associating an ID Tag with a Coordinator

The first time an ID Tag 30 is to be used with a particular Coordinator 20, the unique ID Tag 30 MAC address for that particular ID Tag 30 must become associated with the Coordinator 20. That is, the MAC address of the ID Tag 30 must be recorded inside the memory 41 or "device list" in the Coordinator 20, adding it to the list of ID Tags 30 to be monitored. The procedure to associate an ID Tag 30 with a Coordinator 20 involves placing both the Coordinator 20 into the association procedure 69, and placing the ID Tag 30 to be associated into association procedure 78. Placing Coordinator 20 into association mode is accomplished when the user 11 navigates through the menus using controls 22 and 23 until they find the "Associate ID Tag" function displayed in the LCD display 16, in the text line 16d. Depressing user control 22 selects this function and initiates the "Associate" procedure 69. Placing the ID Tag 30 into association mode 78 is accomplished when user 11 presses and holds button 31 for a specific period of time, typically 5 seconds. When the ID Tag 30 enters association procedure 78, it transmits a start of association response together with the MAC address 87. Next, an "Associating" response 80 it transmitted back to ID Tag 30 via transceiver 51 and ID Tag 30 receives "Associating" response. The Coordinator 20 then determines if the MAC address received is in a list 81. If so, "Previoiusly associated" 82 is transmitted. If not, MAC address is added to list 83. Subsequently, user enteres the common name 84 such as "briefcase," "car keys," or "camera." Coordinator 20 then transmits "Associated" 85 and for particular Tag 30 assocation procedure is done 86.

This association procedure 78 is required only once when a new ID Tag 30 is brought into use with a particular Coordinator 20. A user 11 may possess more than one Coordinator 20, and each ID Tag 30 must be individually associated with each Coordinator 20. A PC-based application program allows the user 11 to create and edit common names, and upload the names to the Coordinator 20 through the USB port 25. The application program may also be used to copy ID Tag 30 common names between other Coordinators 20.

F. Determining Proximity of ID Tags

ID Tags 30 that are associated with a Coordinator 20 comprise the list of active ID Tags 30. The particular ID Tag 30 may now be affixed to an object and used for keeping track of that object. With each the various objects a user 11 may want to track affixed with a unique ID Tag 30, the Coordinator 20 commences maintaining communication with each ID Tag 30. Referring to FIG. 6 and FIG. 7, a "Hello" command 61 is transmitted containing the first and then subsequently the next MAC address in the current list of objects to track. Each and every ID Tag 30 wakes up from a power-saving sleep mode 79 long enough to for the transceiver 51 to receive a broadcast. If the MAC address of the 'Hello' command 61 matches the MAC address 70 of that particular ID Tag 30, then that ID Tag 30 transmits a Reply Status 75 that is processed during a timing interval 74. In the case where the call button 31 was depressed by user 11, "Announce" response 63 is made via sound generator 18. Physical events occurring with any ID Tag 30 may include but are not limited to: detecting motion 53 using a commercially available x/y/z motion detection chip 53; detecting changes in visible light 72 using a commercially available light detection chip; or the pressing of the call button 31. These events are saved 74 as response data to be sent back to a calling Coordinator 20 the next time the ID Tag 30 responds 70 to the "Hello" request 61.

The strength of Coordinator 20 transmission signal received 73 by the ID Tag 30 is measured by a process built into the transceiver chip 51 and saved as a reply response 74 along with the current battery voltage level 52 which is also measured by a process built into the transceiver chip 51. In a preferred embodiment, transceiver chip 51 compares a transmit power of the ID Tag 30 to the last signal strength received 73, and then transceiver chip 51 can optimize the transmit power of ID Tag 30 in the next communication cycle.

The received signal strength 73 of a transmitted broadcast 61 is dependent upon numerous physical and environmental factors and influences. Lending to the nature of radio signal propagation, the present invention does not attempt to measure or correlate signal strength with the actual distance, as may be measured in feet or meters, between objects. Rather, the present invention uses the changes in signal strength sampled over time between each object polled to determine if the object or the user 11 is moving relative to the last sample 73. Changes in relative signal strength are processed 65 taking into account if motion was detected 53 in ID Tag 30, or if motion 43 was detected in Coordinator 20, or both. From this data, it may be determined that either the object may be moving away from the user 11; the viewer may be moving away from the object; or that no change between the relative proximity of viewer to object has occurred. Further the flow logic will process 67 key entries 22 and 23 and whether the "Associate" function 68 has been selected.

G. Coordinator Interface with PC and Application Program

FIG. 9 depicts how a Coordinator 20 may be connected to a Personal Computer (PC) 90 using a standard USB cable 91. USB cable 91 connected to the Coordinator 20 to the USB port 25. An application program installed on PC 90 then provides the user 11 with many functions, enabling user 11 to more effectively manage the information contained in the Coordinator 20, or multiple Coordinators 20.

Common names are associated with MAC addressed of ID Tags 30 so that it is easier for the user 11 to identify which object or ID Tag 30 is being interacted. Because of simple user controls 22 and 23, entering alphanumeric characters is best done from the PC 90. The application program is programmed to communicate with the Coordinator 20 such that it facilitates the uploading for the MAC address tables contained in the memory of the Coordinator 20. Using a menu function in the application program, the user 11 enters the common name for each MAC address. The MAC address is printed on the back of each ID Tag 30 at the time of manufacturing for easy visual identification. The completed list is saved on the hard disk of the PC 90 according to the present invention, and then uploaded back into the Coordinator 20.

Through the connection 91 of the Coordinator 20 to PC 90, additional functions may be performed that are either may not be available from the Coordinator 20 directly, or are made easier to enter using the PC application. These include, but are not limited to: updating the firmware program contained in the microprocessor 41 memory; enable or disable the audible beep of the Coordinator 20; allowing configuration data from one Coordinator 20 to be transferred to another Coordinator 20; and display a list of options that describe the individual behaviors of each ID Tag 30.

The individual behaviors of each ID Tag 30 many include:
  emit a short audible beep, or not, upon entering the immediate proximity of a Coordinator 20;
  emit a short auditable beep, or not, upon leaving the immediate proximity of a Coordinator 20;
  emit a "warning" beep tone upon leaving the immediate proximity of a Coordinator 20;
  emit an audible beep tone, or not, upon receiving a "call" from a Coordinator 20; and
  illuminate the visible LED 32, or not, upon receiving a "call" from a Coordinator 20.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular System and Method for Locating Objects as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A system for locating objects comprising:
   a first Coordinator comprising a first antenna, a first power source, a first integrated transceiver microprocessor, the first power source electrically connected to the first integrated transceiver microprocessor, and the antenna coupled to the first integrated transceiver microprocessor;
   an Identification Tag comprising a second antenna, a second power source, a second integrated transceiver microprocessor, the second power source electrically connected to the second integrated transceiver microprocessor, and the antenna coupled to the second integrated transceiver microprocessor;
   wherein the first and second integrated transceiver microprocessors communicate with each other according to predetermined timing cycles optimized for power consumption; and
   wherein the first Coordinator further comprises an LCD display conveying information to a user, the information including a signal strength corresponding to a transmitted and a received power, and wherein the signal strength is a relative measure of distance between the first Coordinator and the Identification Tag; and
   wherein the system further comprises a second Coordinator wherein the first and second Coordinators communicate with each other having a signal strength associated therewith, the signal strength a measure of the relative distance between the first and second Coordinators; and
   wherein the first Coordinator and the Identification Tag are comprised of durable shock resistant material; and
   wherein the first Coordinator and the Identification Tag each comprise a battery compartment cover; and
   wherein the first Coordinator comprises a battery voltage, the battery voltage continually monitored and wherein an indication is provided when the battery voltage drops below a minimum operating value; and
   wherein the Identification Tag is integrated directly into an object to be tracked, wherein the object has material suitable for Identification Tag integration; and
   wherein the first Coordinator further comprising a USB port and wherein the first power source can be recharged via the USB port; and wherein the first Coordinator is a cellular device.

2. The system of claim 1, the first Coordinator further comprising a first sound device coupled to the first processor, the sound device programmed to audibly indicate when the first Coordinator unit loses (or regains) communications with the Identification Tag; and
   wherein the first sound device comprises a simple beep generator, able to generate a plurality of combinations of short and/or prolonged beeps, wherein each of said plurality of combinations corresponds to a condition of the Identification Tag; and
   wherein the identification Tag further comprises a second sound device coupled to the second integrated transceiver microprocessor, the second sound device programmed to audibly indicate when the Identification Tag receives an appropriate polling command from the first Coordinator; and wherein the first Coordinator further comprises a beacon coupled to the first integrated transceiver microprocessor, the beacon programmed to visually indicate when the first Coordinator loses (or regains) communications with the Identification Tag; and wherein the Identification Tag further comprises a second beacon device coupled to the second integrated transceiver microprocessor, the second beacon device programmed to visually indicate when the Identification Tag receives an appropriate polling command from the first Coordinator; and wherein the Coordinator further comprises a first user interface wherein the user can initiate a communication between the first Coordinator and the Identification Tag.

3. The system of claim 1, wherein the LCD display information further includes a Coordinator battery voltage, an Identification Tag battery voltage, an Identification Tag common name, and an indication that the Identification Tag is not responding to a communication; and wherein the first Coordinator further comprises a first motion sensor able to detect when the first Coordinator is physically moving, and wherein the Identification Tag further comprises a second motion sensor able to detect when the Identification Tag is physically moving; and wherein a communication between the first Coordinator and the Identification Tag comprises a plurality of bytes of information, and wherein the bytes of information comprise a transmit power of the identification Tag, and movement of the Identification Tag based on the second motion sensor, the movement available as information on the LCD display; and wherein the transmit power of the Identification Tag in successive communication cycles is compared by the first integrated transceiver microprocessor, and wherein information from the first and second motion sensors are further compared by the first integrated transceiver microprocessor to determine if the identification Tag is moving toward or moving away; and wherein the transmit power of the Identification Tag is compared to the signal strength and wherein the transmit power of a subsequent communication cycle is optimized based on said transmit power of the Identification Tag and said signal strength.

4. The system of claim 1, wherein the Identification Tag further comprises a preprogrammed interval corresponding to the second integrated transceiver microprocessor enabling the Identification Tag to wake up and listen for communication from the first Coordinator, the preprogrammed interval optimized for power consumption.

5. The system of claim 1, further comprising a plurality of second and subsequent Identification Tags each communicating with the first Coordinator according to predetermined timing cycles optimized for power consumption; and wherein the LCD display conveying the information further includes a signal strength corresponding to a relative measure of distance between the first Coordinator and each of the second and subsequent Identification Tags; and wherein the plurality of second and subsequent Identification Tags can be selectively tracked by the first Coordinator or otherwise remain inactive; and wherein the first Coordinator further comprises a toggle switch configured to selectively scroll-up or scroll-down a list of items, the toggle switch further having a push operation to select an item, the first Coordinator further comprising a separate switch for un-selecting an item.

6. The system of claim 1, the Identification Tag further comprising:
a selectively attachable clip appropriate for fastening the Identification Tag to a pocket or a belt;
a key chain clip suitable for attaching the Identification Tag to a key chain; and
a carrying strap suitable for wearing around a user's neck or wrist; and
wherein the Identification Tag is manufactured with a unique electronic address different from all others manufactured.

7. The system of claim 1, wherein the LCD display conveying information further includes a motion indicator, the motion indicator comprising symbols to indicate relative movement between the first Coordinator and the Identification Tag.

8. A method for tracking an object comprising:
providing a Coordinator unit having a first transceiver chip and an LCD display
attaching an Identification Tag to the object to be tracked, the Identification Tag having a second transceiver chip;
communicating wirelessly between the Coordinator and the Identification Tag;
optimizing power consumption for communication according to predetermined timing cycles; and
conveying information to a user, the information including a signal strength corresponding to a transmitted and a received power, and wherein the signal strength is a relative measure of distance between the Coordinator and the Identification Tag; and
programming the Coordinator to audibly indicate when the Coordinator loses (or regains) communications with the Identification Tag, wherein the programming the Coordinator to audibly to indicate when the Coordinator loses (or regains) communications with the Identification Tag comprises a simple beep generator, able to generate a plurality of combinations of short and/or prolonged beeps, wherein each of said plurality of combinations corresponds to a condition of the Identification Tag.

9. The method of claim 8, further comprising:
polling the Identification Tag to initiate a communication;
programming the Identification Tag to audibly indicate when the Identification Tag receives an appropriate polling command from the Coordinator;
programming the Coordinator to visually indicate when the Coordinator loses (or regains) communications with the Identification Tag;
polling the Identification Tag to initiate a communication; and
programming the Identification lag to visually indicate when the Identification Tag receives an appropriate polling command from the Coordinator;
displaying information on the Coordinator, the information including a Coordinator battery voltage, an Identification Tag battery voltage, an Identification Tag name, and an indication that the Identification Tag is not responding to a communication;
detecting when the Coordinator is physically moving;
detecting when the Identification Tag is physically moving;
processing the detecting the moving of the Coordinator and the Identification Tag along with a transmit power and a received power of successive communication cycles to determine if the Identification Tag is moving toward or moving away;
comparing a transmit power of the Identification Tag to the signal strength and wherein the transmit power of the subsequent communication cycle is optimized based on said transmit rower of the Identification Tag and said signal strength; and manufacturing the Identification Tag with a unique electronic address different from all others manufactured.

10. The method of claim 8, further comprising providing a plurality of second and subsequent Identification Tags each communicating with the Coordinator according to predetermined timing cycles optimized for power consumption; and wherein the conveying the information further includes a signal strength corresponding to a relative measure of distance between the Coordinator and each of the second and subsequent Identification Tags; and wherein the method further comprises selectively tracking the plurality of second and subsequent Identification Tags using the Coordinator.

11. The method of claim 8, further comprising:

providing for the Coordinator a toggle switch configured to selectively scroll-up or scroll-down a list of items, the toggle switch further having a push operation to select an item;

providing the Coordinator a separate switch for un-selecting an item; and providing a cellular device configured for use as a coordinator.

12. The method of claim 8, further comprising preprogramming an interval for the Identification Tag to wake up and listen for communication from the Coordinator, the interval optimized for power consumption.

13. The method of claim 8, further comprising:

providing a USB port to the Coordinator;

uploading selectable features to the Coordinator from a computer device via a USB cable;

providing a clip for the Identification Tag appropriate for fastening the Identification Tag to a pocket or a belt;

providing a second Coordinator, wherein the Coordinator is a first Coordinator;

communicating between the first and second Coordinators having a signal strength associated therewith, the signal strength a measure of the relative distance between the first and second Coordinators;

manufacturing the Coordinator and the Identification Tag of durable shock resistant material; and providing a battery compartment cover for each of the Coordinator and the Identification Tag.

14. The method of claim 8, wherein the Coordinator comprises a battery voltage, the method further comprising continuously monitoring the battery voltage and providing an indication when the battery voltage drops below a minimum operating value; and wherein the method further comprises integrating the Identification Tag directly into an object to be tracked, wherein the object has material suitable for Identification Tag integration; and wherein the Coordinator further comprises a power supply and a USB port, the method further comprising recharging the power supply via the USB port.

15. The method of claim 8, wherein the conveying information further includes a motion indicator, the motion indicator indicating relative movement between the Coordinator and the Identification Tag using symbols.

16. A method of associating a plurality of Identification Tags to a Coordinator, the method comprising:

providing each Identification Tag with a unique MAC address;

transmitting from a first Identification Tag to the Coordinator to start the associating along with a first unique MAC address for the first identification Tag;

receiving the first unique MAC address to the Coordinator;

comparing the first unique MAC address to a list of previously associated MAC addresses;

adding the first unique MAC address to the list of previously associated MAC addresses, in the event that the first unique MAC address is not currently on the list;

entering a common name of an object associated with the first Identification Tag; and repeating the method for second and subsequent identification Tags.

17. The method of claim 16, wherein subsequent to the receiving the first unique MAC address to the Coordinator, the method further comprised transmitting to the first Identification Tag that the Coordinator is "associating."

18. The method of claim 16, wherein if the first unique MAC address is currently in the list of previously associated unique MAC addresses, the method further comprises transmitting to the first Identification Tag "previously associated" and wherein the method further comprises transmitting "associated" to the first Identification Tag after the entering the common name of the object associated with the first Identification Tag.

* * * * *